United States Patent

Matsui

Patent Number: 5,978,345
Date of Patent: Nov. 2, 1999

[54] ASTIGMATIC DIFFERENCE CORRECTING METHOD FOR OPTICAL HEAD AND APPARATUS THEREFOR

[75] Inventor: Tsutomu Matsui, Tokyo, Japan

[73] Assignee: NEC Corporation, Japan

[21] Appl. No.: 08/967,855

[22] Filed: Nov. 12, 1997

Related U.S. Application Data

[62] Division of application No. 08/493,840, Jun. 22, 1995, Pat. No. 5,777,961.

[30] Foreign Application Priority Data

Jun. 27, 1994 [JP] Japan ................................. 6-144282
Oct. 28, 1994 [JP] Japan ................................. 6-265289

[51] Int. Cl.$^6$ .................................................. G11B 7/00
[52] U.S. Cl. .................................... 369/112; 369/44.23
[58] Field of Search ........................... 369/44.23, 44.27, 369/44.37, 44.41, 54, 112, 121, 122

[56] References Cited

U.S. PATENT DOCUMENTS 4,564,268  1/1986  Tatsuno et al. .
5,270,997  12/1993  Katayama ................................. 369/112
5,351,224  9/1994  Nagata et al. ........................ 369/54 X
5,504,726  4/1996  Semba ................................. 369/44.28

FOREIGN PATENT DOCUMENTS 0439100  7/1991  European Pat. Off. .
4-363084  12/1992  Japan .
2100880  1/1983  United Kingdom .

OTHER PUBLICATIONS

Small, Light, and Simple Pickups for Optical Disk Systems, "Optical Science", vol. 16, No. 8, pp. 331–338, Aug. 1987.
*Patent Abstracts of Japan*, vol. 011, No. 129 (P–570), Apr. 23, 1987 & JP–A–61271633.

*Primary Examiner*—W. R. Young
*Attorney, Agent, or Firm*—Ostrolenk, Faber, Gerb & Soffen, LLP

[57] ABSTRACT

According to an astigmatic difference correcting method for an optical head, a rotational optical member which is arranged between a first laser beam source having an astigmatic difference and a collimator lens to be rotatable around an optical path of a laser beam of a first wavelength emitted from the first laser beam source is rotated and adjusted. Rotation and adjustment of the rotational optical member is caused to set a minimum difference between focal positions in an X-axis direction and in a Y-axis direction which are perpendicular to the optical path of the laser beam. The laser beam in which the difference between the focusing offset positions is minimum is irradiated on an optical disk having a recording density having a bit length not more than half a laser wavelength.

3 Claims, 11 Drawing Sheets

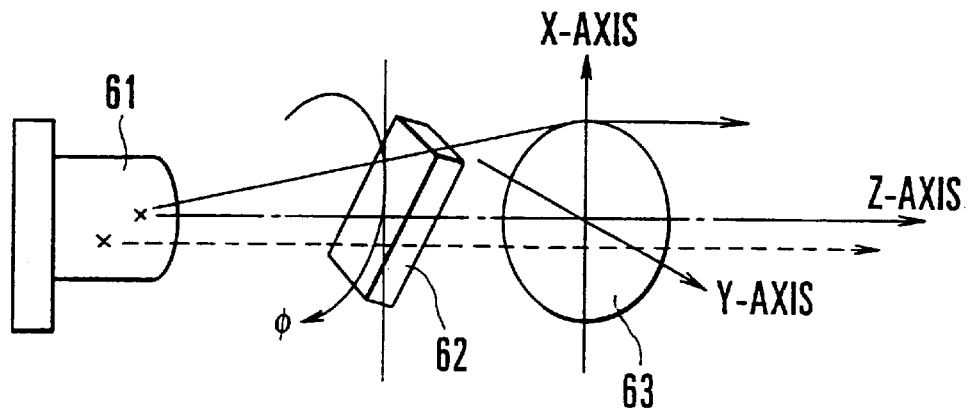
F I G. 6
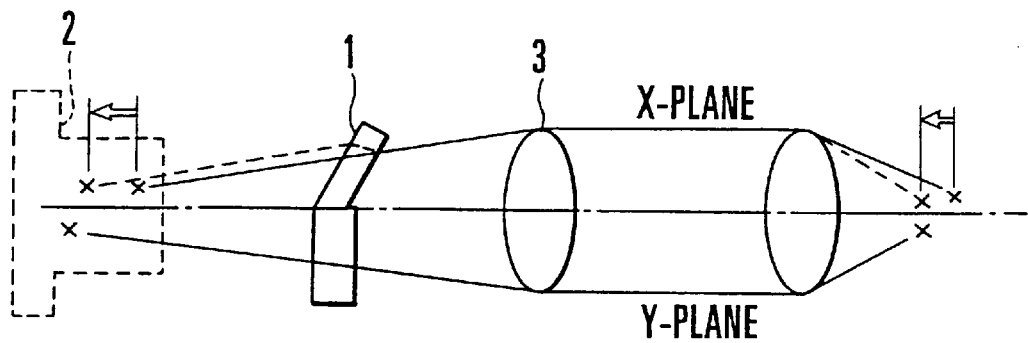
F I G. 7

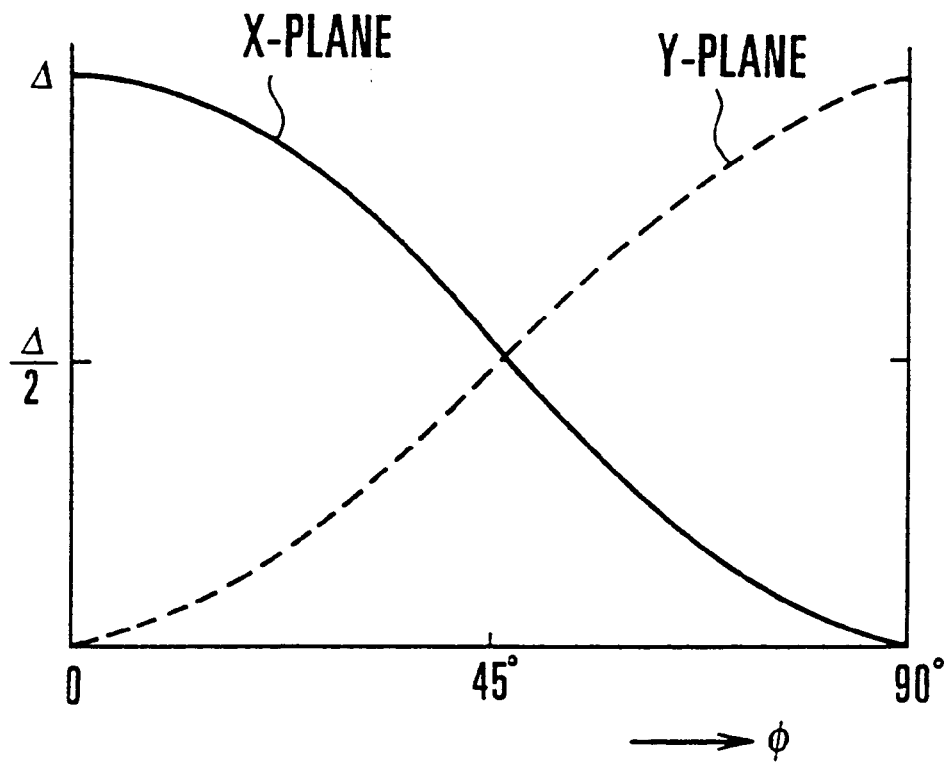
F I G. 8

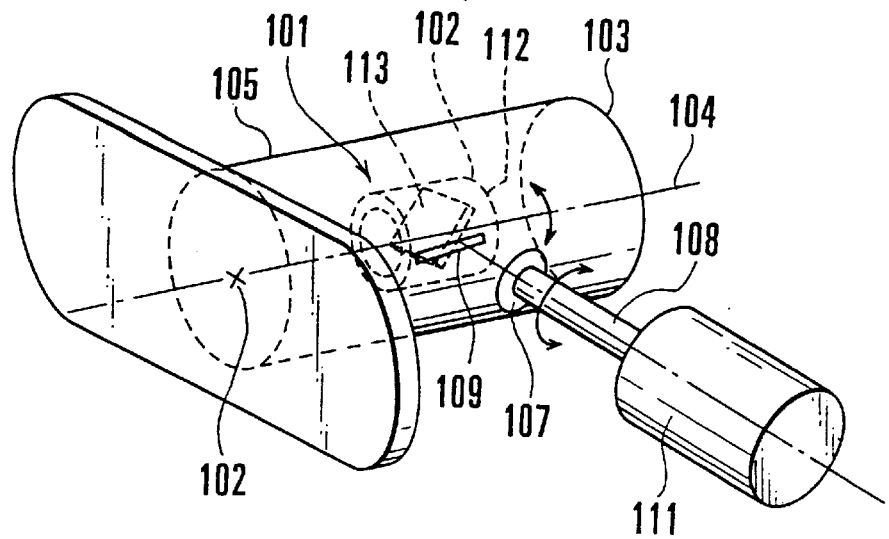
F I G. 12
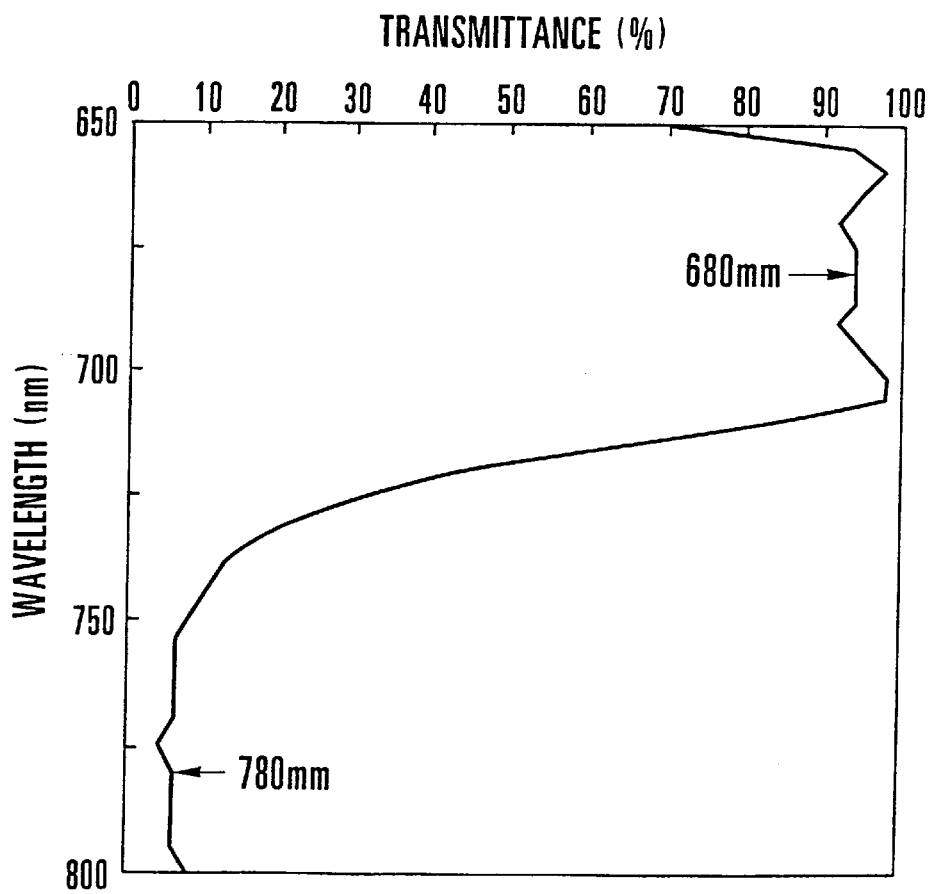
F I G. 13

ASTIGMATIC DIFFERENCE CORRECTING METHOD FOR OPTICAL HEAD AND APPARATUS THEREFOR

This is a Division of application Ser. No. 08/493,840, filed Jun. 22, 1995, now U.S. Pat. No. 5,777,961.

BACKGROUND OF THE INVENTION

The present invention relates to a method of improving an optical disk device, for a ROM disk, a writing once disk, or an erasable disk for high-density recording, in which a focusing offset for the best reproduction signal is different from a focusing offset for the best tracking error signal and, more particularly, to an astigmatic difference correcting method for an optical head used in an optical disk device for high-density recording or the like and an apparatus therefor.

An optical system for a conventional optical head has no provision for correcting an astigmatic difference of a semiconductor laser. In the optical system, the focusing offset which will achieve the best reproduction signal (RF signal) is generally different from that which will achieve the best tracking error signal.

FIGS. 15 and 16 respectively show the best RF signal and the best tracking error signal when the levels of a digital reproduction (RF) signal which forms an eye pattern and a tracking error (TE) signal are changed with a change in focusing offset. As is apparent from FIGS. 15 and 16, when a focused beam has an astigmatic difference due to a change in focusing offset (the degree to which the beam is out of focus), a modulation transfer function (to be referred to as an MTF hereinafter) in the tangential direction of an optical disk increases. That is, it is understood that the best RF signals and best tracking error signals of beams focused in the tangential and radial directions of the disk are different conditions and these situations depend on focusing offsets. More specifically, when an astigmatic difference occurs due to a focusing position of a focused beam, the beam becomes an elliptic beam, and the lengths of the major and minor axes are different from each other. For this reason, MTFs are different in the tangential and radial directions of the disk which are perpendicular to each other. An RF signal is maximum when the beam is focused in the tangential direction of the disk, and the best tracking error signal can be obtained when the beam is focused in the radial direction of the disk. In this case, when the maximum and minimum outputs of a reproduction signal from the optical disk are represented by A and B, respectively, an MTF is expressed by $MTF=(A-B)/(A+B)$.

It is important that a tracking servo operation is stabilized and a good RF signal is obtained in an optical head designed to have a high recording density and a high transfer rate.

In an optical head, the best focusing offset position required to maximize a tracking error signal is different from the focusing offset position required to maximize an RF signal. Therefore, although a tracking servo operation is stabilized when the tracking error signal is best, a good signal cannot be reproduced when focusing position is set for optimum tracking in MTF. In contrast to this, when a focusing offset is set to obtain the best RF signal, a tracking operation is disadvantageously performed. A serious problem in which a focusing offset for the best tracking error signal is different from a focusing offset for the best RF signal is supposed to be posed by the astigmatic difference of a focused beam.

SUMMARY OF THE INVENTION

It is an object of the present invention to provide an astigmatic difference adjusting method for an optical head, in which a focusing offset for the best tracking error signal can be set equal to a focusing offset for the best RF signal by making it possible to easily adjust an astigmatic difference of the optical head.

In order to achieve the above object, referring to the present invention, there is provided an astigmatic difference correcting method for an optical head, comprising the steps of rotating and adjusting a rotational optical member which is arranged between a first laser beam source having an astigmatic difference and a collimator lens to be rotatable around an optical path of a laser beam of a first wavelength emitted from the first laser beam source, causing rotation and adjustment of the rotational optical member to set a minimum difference between focal positions in an X-axis direction and in a Y-axis direction which are perpendicular to the optical path of the laser beam, and irradiating the laser beam in which the difference between the focusing offset positions is minimum on an optical disk having a recording density having a bit length not more than half a laser wavelength.

BRIEF DESCRIPTION OF THE DRAWINGS

FIG. 6 is a view for explaining astigmatic difference correction performed by an inclined plate glass;

FIG. 7 is a view showing optical paths in astigmatic difference correction performed by the inclined plate glass;

FIG. 8 is a graph showing a change in astigmatic difference caused by the inclined plate glass;

FIG. 12 is a perspective view showing main part for explaining rotational driving of an astigmatic difference correcting optical part shown in FIG. 11;

FIG. 13 is a graph showing the spectral characteristics of a dichroic mirror shown in FIG. 11;

DESCRIPTION OF THE PREFERRED EMBODIMENTS

Embodiments of the present invention will be described below with reference to the accompanying drawings.

Figures 1A, 1B:
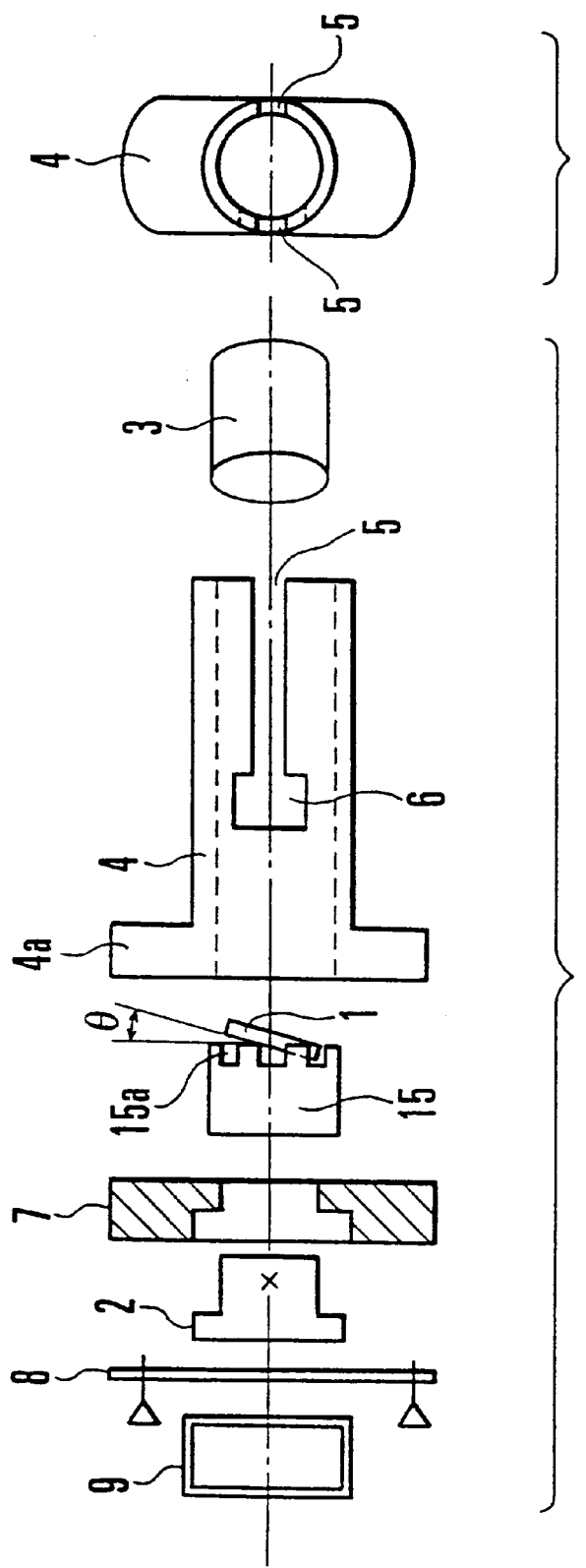
FIG. 1A is an exploded view showing a laser pen having an astigmatic difference correcting apparatus according to an embodiment of the present invention.
FIG. 1B is a front view showing a collimator lens holder shown in FIG. 1A.

FIG. 1A shows an astigmatic difference correcting apparatus according to the first embodiment of the present invention, and FIG. 1B shows a collimator lens holder shown in FIG. 1A.

Referring to FIG. 1A, an inclined plate glass 1 is arranged between a semiconductor laser 2 having an astigmatic difference and a collimator lens 3. During astigmatic difference correction, the inclined plate glass 1 is rotated (rotational angle=φ) around an optical axis to adjust the inclined plate glass 1. FIG. 1A shows the arrangement of a laser pen having a corrected astigmatic difference.

A collimator lens holder 4 is constructed such that slits 5 in an axial direction are formed in a cylindrical member having an elliptic flange portion 4a formed at one end of the collimator lens holder 4 on the laser 2 side. The collimator lens 3 is fitted in the distal end portion of the collimator lens holder 4 at an accuracy at which the collimator lens 3 is pressed against the collimator lens holder 4. As shown in FIG. 1B, the slits 5 are formed in two opposing portions of the cylindrical member.

Since the slit 5 has mechanical rigidity, the collimator lens 3 is slid along the optical axis to make it possible to adjust the collimator lens 3. With respect to one of the two slits 5, a large rotation adjusting hole 6 is formed in a portion where a laser is to be attached. The hole 6 is used as an adjusting hole for adjusting the rotation of the inclined plate glass 1 held by an inclined plate glass holder 15.

Figure 2:
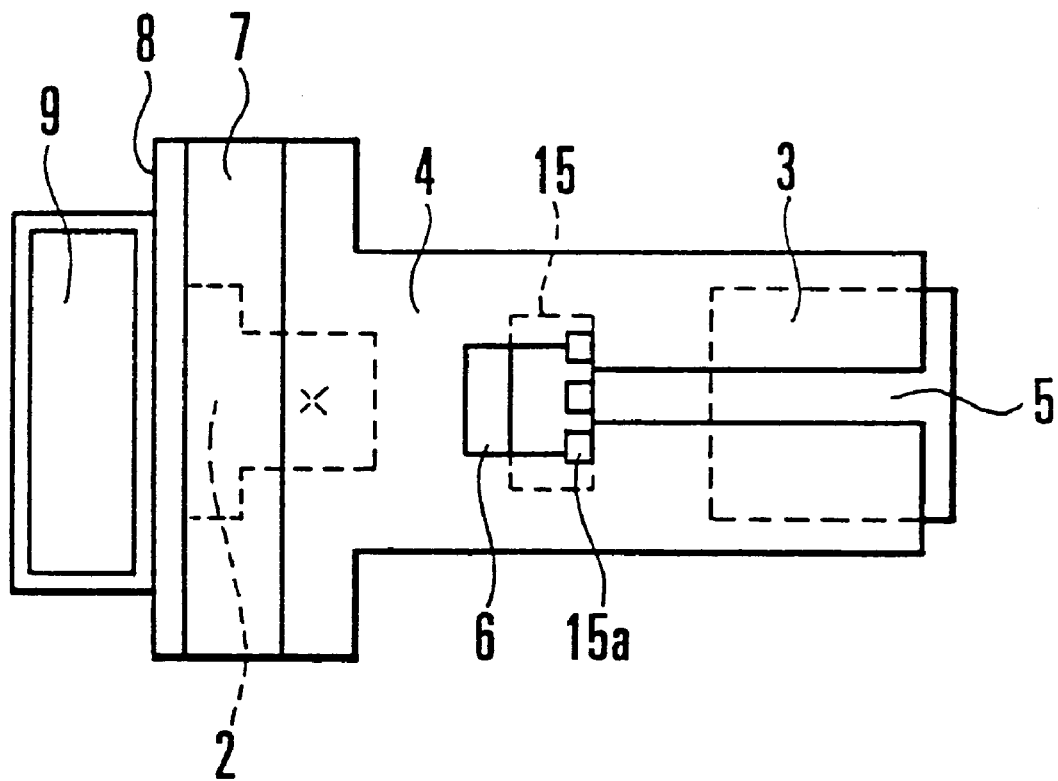
FIG. 2 is an assembly drawing showing the laser pen shown in FIG. 1A.

A laser attachment plate 7 is brought into contact with the flange portion 4a of the collimator lens holder 4, and the laser 2 and a laser holding plate 8 are attached to the plate 7. A high-frequency superposing module 9 is attached to the plate 7 through the holding plate 8. The structure assembled as described above is shown in FIG. 2. A beam emitted from the laser 2 is converted into a parallel beam by the collimator lens 3 held at the distal end of the collimator lens holder 4.

Figure 3:
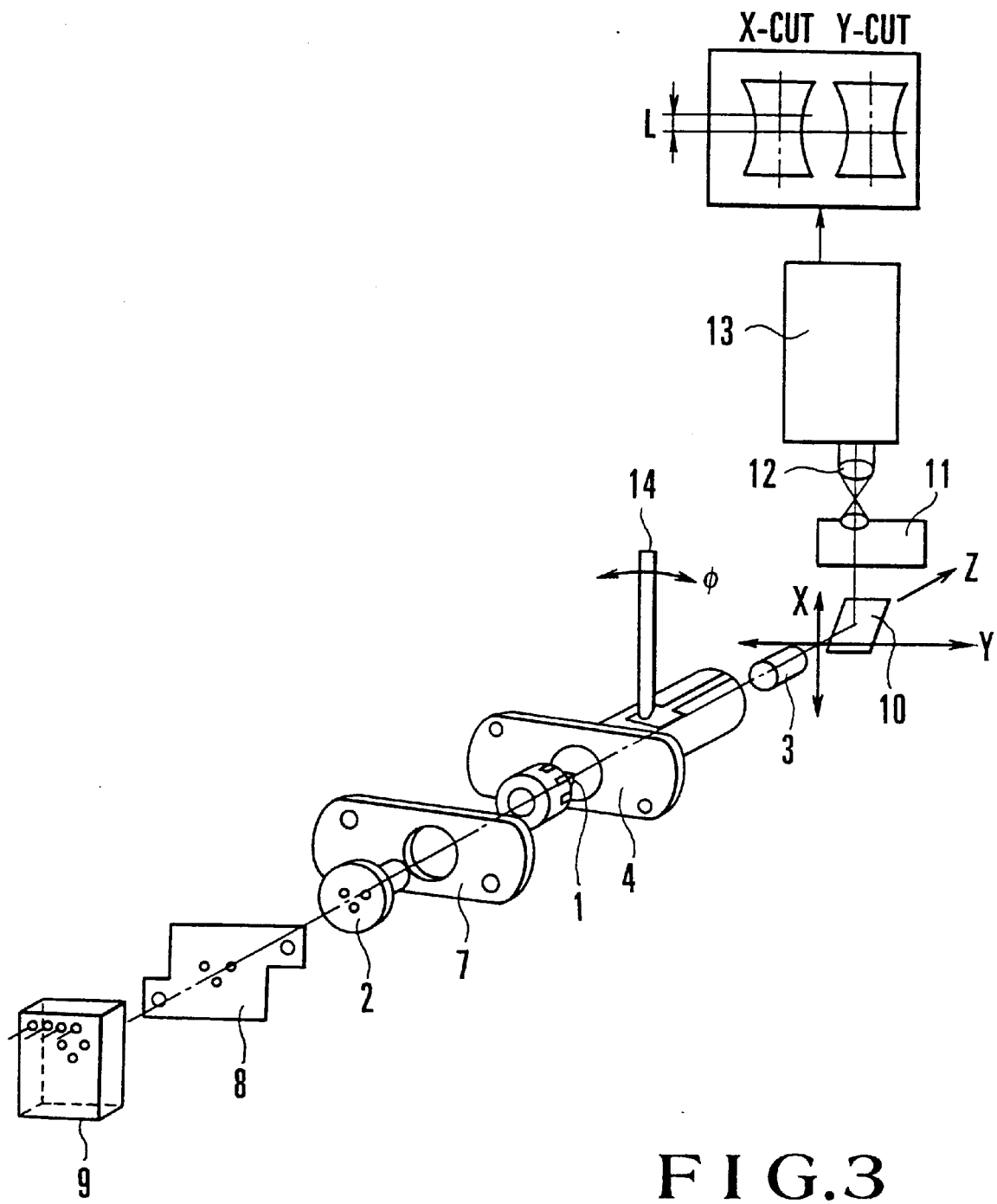
FIG. 3 is an exploded perspective view showing an optical head having the astigmatic difference correcting apparatus shown in FIG. 1A.

FIG. 3 shows the details of assembling of the laser pen and adjustment of the inclined plate glass 1. The parallel beam from the collimator lens 3 is deflected at 90° by a mirror 10 and guided to an objective lens actuator 11 of the optical head. In this case, the focused state of the parallel beam in a Z-axis direction is measured by a focused beam analyzer 13 having an objective lens 12 having a numerical aperture (NA)=0.9.

This analyzer 13 performs stepping at increments of 0.1-μm, and can measure the focused beam as the sectional views (X and Y cuts) of the focused beam on X and Y planes in focused beam detection by the optical head. At this time, when a light amount at an in-focus point of the focused beam is set to be 100%, a position at which a focused beam size in a light amount of $e^{-2}$ (13.5%) is minimum is set on each of the X and Y planes, and these positions are set as focal points on the X and Y planes. A difference L between the focal points in two orthogonal directions is set as an astigmatic difference.

The inclined plate glass 1 is rotated and adjusted while the astigmatic difference is observed. This adjustment is performed such that a lever 14 having a projection is fitted in a groove 15a formed in the inclined plate glass holder 15 (see FIG. 1A).

Figure 4:
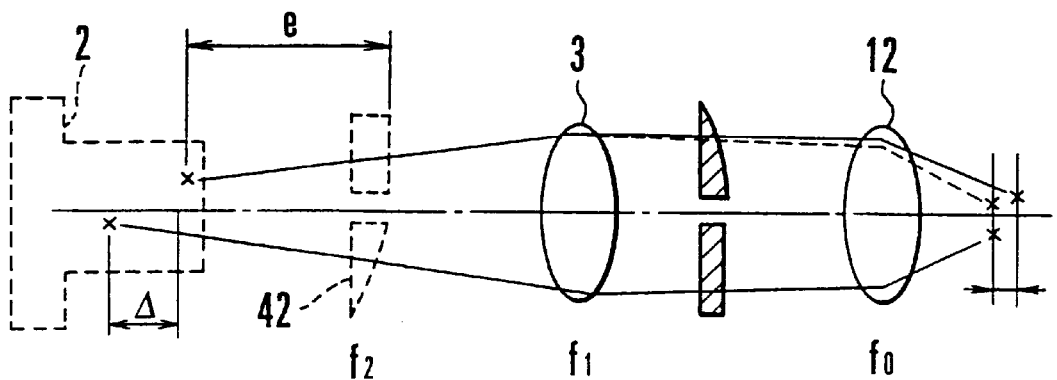
FIG. 4 is a view showing optical paths in astigmatic difference correction performed by a cylindrical lens.

FIG. 4 shows a case wherein a cylindrical lens 42 is used in place of the inclined plate glass 1. Referring to FIG. 4, the cylindrical lens 42 is arranged between the laser 2 and the collimator lens 3. With respect to X-axis and Y-axis serving as coordinate axes in FIG. 3, beam tracks on the X-axis and Y-axis planes are respectively shown in upper and lower sides in FIG. 3. The cylindrical lens 42 which causes a change in astigmatic difference when the cylindrical lens 42 is rotated about the optical axis (Z-axis) has no power on the X plane but has a power on the Y plane. The astigmatic difference of the laser 2 is corrected by rotating the cylindrical lens 42 about the optical axis.

The focal length of the cylindrical lens 42 is represented by f2; the focal length of the collimator lens 3, f1; the focal length of the objective lens 12, f0; and the distance between the laser 2 and the cylindrical lens 42, e. In this case, a correctable astigmatic difference Δ is expressed by equations (1) and (2).

$$\Delta_0 = f1/f2 \cdot e \text{ (rotational angle } \phi \text{ about optical axis=0°)} \quad (1)$$

$$\Delta = \Delta_0 \cdot \cos(2\phi) \quad (2)$$

The difference between the focal positions (focal points) of the collimator lens 3 on the X and Y planes is an astigmatic difference. The astigmatic difference (as) of the objective lens 12 is expressed by equation (3).

$$as = (f0/f1)^2 \cdot \Delta \quad (3)$$

Figure 5:
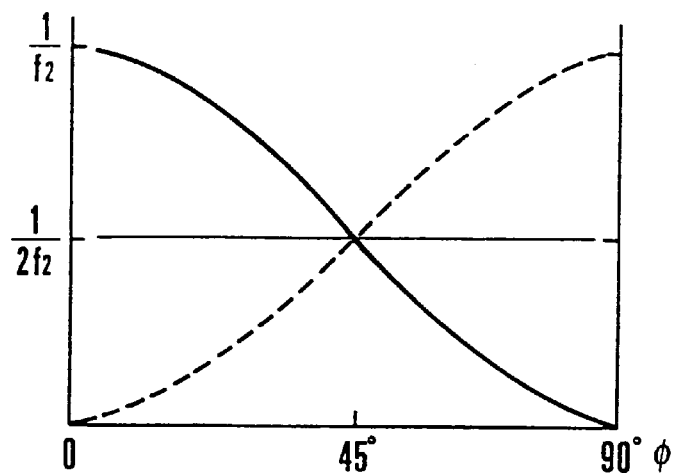
FIG. 5 is a graph showing changes in focal length on X and Y planes caused by rotation of a cylindrical lens.

A cylindrical lens having a large focal length and a curvature radius of 5,000 mm or more and arranged in a collimated beam can be rotated about the optical axis in the same manner as described above to adjust the cylindrical lens. The cylindrical lens is rotated to calculate the reciprocals of the focal lengths in the X- and Y-axes, thereby obtaining the same characteristics as shown in FIG. 5. When the cylindrical lens is rotated about the optical axis, and a focal length in each axial direction is represented by f, a relation shown as equation (4) is obtained.

$$1/f = 1/f2 \cdot \cos(\phi) \quad (4)$$

The reciprocal of a change in focal length when the cylindrical lens is rotated about the optical axis is shown in FIG. 5.

FIGS. 6 and 7 show a case wherein the inclined plate glass is rotated. FIG. 7 shows a case wherein a coordinate system obtained by arranging the respective optical parts shown in FIG. 6 is set. The beam track on the upper side shows the X plane, and the beam track on the lower side shows the Y plane. A change in astigmatic difference Δ when the inclined plate glass 1 is rotated about the Z axis is shown in FIG. 8. In this case, the same relation as equation (2) is obtained.

Figure 9:
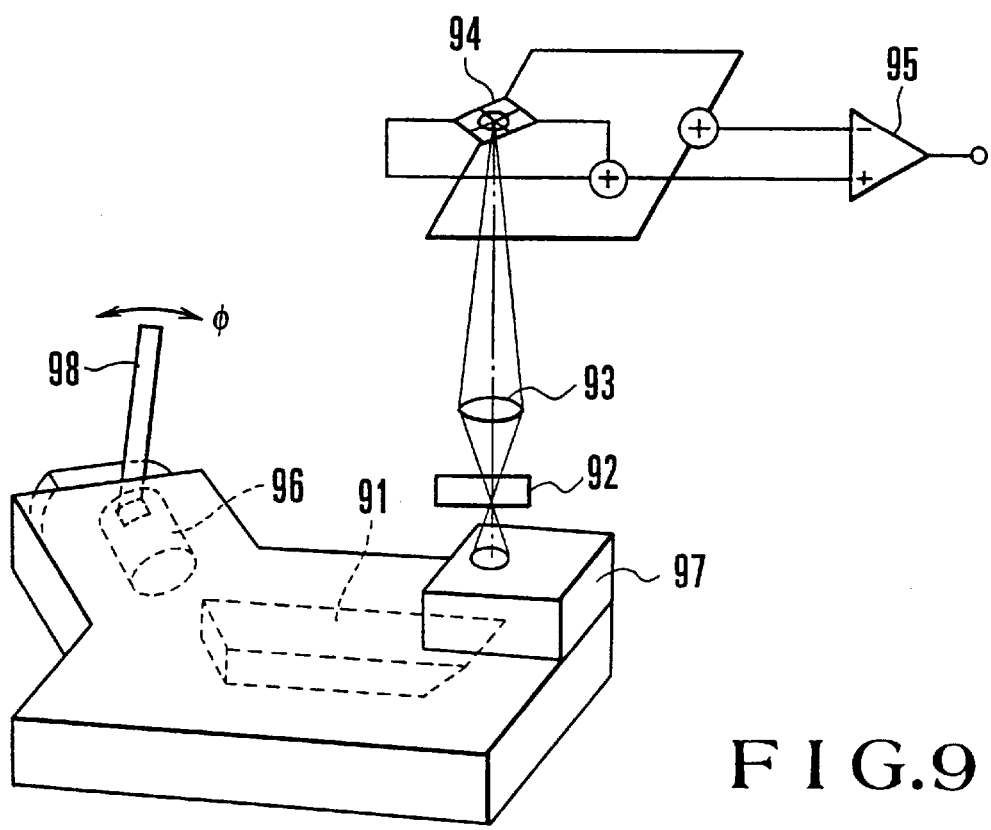
FIG. 9 is a view showing an astigmatic difference adjusting system for an optical head.

An apparatus for correcting the astigmatic difference between the laser of an optical head and a compound prism 91 is shown in FIG. 9.

Figure 10A:
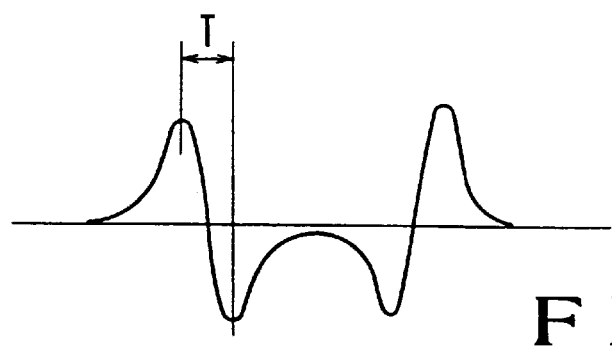
FIG. 10A is a chart showing a signal waveform when an astigmatic difference is large.
Figure 10B:
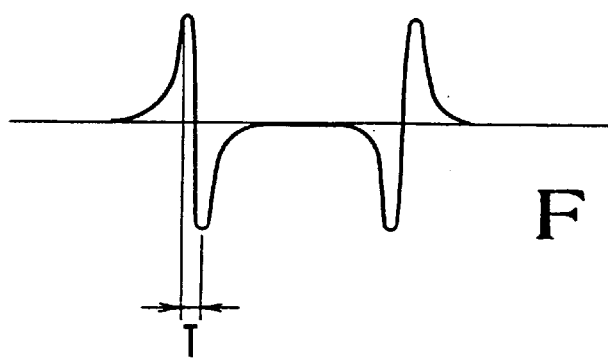
FIG. 10B is a chart showing a signal waveform when an astigmatic difference is corrected.

Referring to FIG. 9, an expensive objective lens having a numerical aperture of 0.9 is not used, a focused beam emitted from an objective lens actuator 92 through a laser pen 96, the compound prism 91, and an optical path direction changing unit 97 is input to an objective lens 93 having a numerical aperture almost equal to that of the lens used in the optical head. The objective lens actuator 92 for measuring an astigmatic difference is wobbled in the condition of setting a cover glass having a thickness corresponding to the cassette coating of a disk. The focused beam which is changed by the astigmatic difference is input to a four-division sensor 94. Two addition signals obtained by adding each two outputs from the four-division sensor 94 are input to a differential amplifier 95, thereby obtaining a waveform representing an astigmatic focusing error signal. The waveforms of the signals obtained by the differential amplifier 95 are shown in FIGS. 10A and 10B, respectively. FIG. 10A shows the waveform of the signal obtained when an astigmatic difference is large, and FIG. 10B shows the waveform of the signal obtained when an astigmatic difference is corrected. An adjustment lever 98 operates to decrease an interval T between positive and negative peaks of each waveform, thereby rotating and adjusting the cylindrical lens or the inclined plate glass.

Figure 11:
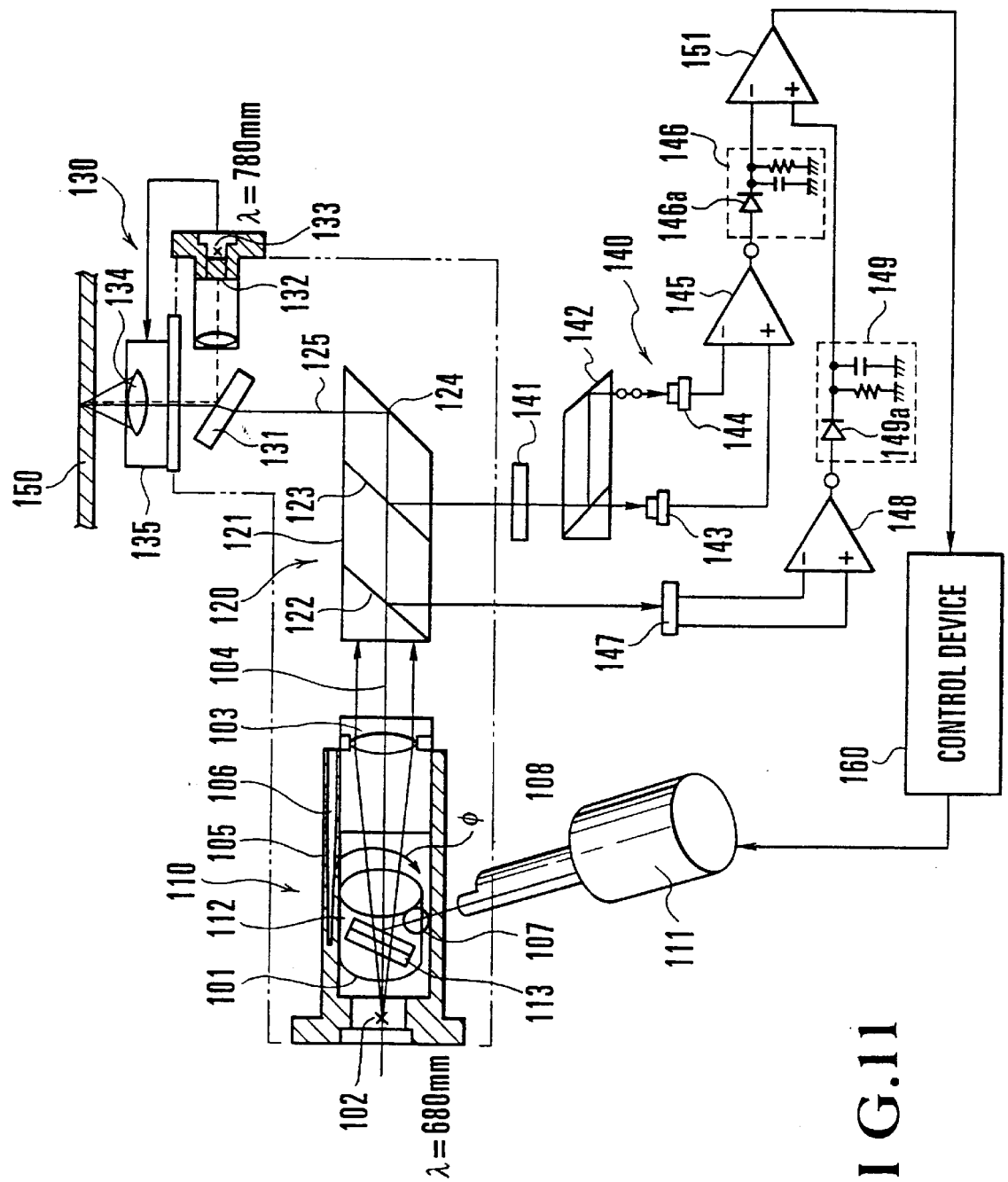
FIG. 11 is a view showing the entire arrangement of an optical head having an astigmatic difference correcting apparatus according to another embodiment of the present invention.

FIG. 11 shows an optical head having an astigmatic difference correcting apparatus according to the second embodiment of the present invention. As shown in FIG. 11, the astigmatic difference correcting apparatus comprises an adjusting unit 110 for actually performing astigmatic difference correction, an optical path direction changing unit 120 for changing the directions of the optical paths of a laser beam emitted from the adjusting unit 110 and a beam reflected by a optical disk 150 for high-density recording, a spectral unit 130 for causing a laser beam from the optical path direction changing unit to be incident on and emerge from the optical disk 150, and an error detector 140.

In this case, an optical disk for high-density recording used in the present invention is an optical disk having a bit length which is half a laser wavelength. More specifically, an optical disk having a high recording line density in which a bit length is 2.4 times the density of a currently available compact disk (CD) having 0.8 $\mu$m/bit and is 1.02 times a laser wavelength ($\lambda$=0.78 $\mu$m) is called an optical disk for high-density recording.

The adjusting unit 110 comprises an optical part 101 consisting of an inclined transparent plate glass, a laser beam source 102 serving as a light source, a collimator lens 103, and a collimator holder 105 for storing these components. The collimator holder 105 has a cylindrical shape, and a slit 106 is formed from the distal end of the collimator holder 105 along an optical axis 104. As in FIGS. 1 and 2, the collimator lens 103 is fitted in the distal end portion of the collimator holder 105 at an accuracy at which the collimator lens 103 is pressed against the collimator holder 105. The slit 106 forms a mechanical gap between the inner periphery of the collimator holder 105 and the outer periphery of the collimator lens 103 and, at the same time, makes the collimator holder 105 and the collimator lens 103 mechanically rigid, thereby making the collimator lens 103 adjustable in the direction of the optical axis 104. A rotation adjusting hole 107 is formed in a portion near the laser attached to the proximal end portion of the collimator holder 105. This rotation adjusting hole 107 functions as an adjusting window in which an eccentric pin (to be described later) is inserted to rotate/adjust the astigmatic difference correcting optical part 101 (to be referred to as an optical part hereinafter) such as an inclined plate transparent glass. In the following description, in order to simplify the description, this adjusting window is called as a window portion. The adjusting unit 110 arranges the optical part 101 between the laser beam source 102 and the collimator lens 103 and rotates (rotational angle=$\phi$) the optical part 101 around optical axis 104 during astigmatic difference correction to adjust the optical part 101.

FIG. 12 shows the embodiment figure of the adjusting unit 110 for astigmatic difference regulation in FIG. 1. As shown in FIG. 12, the optical part 101 constituted by a cylindrical lens or an inclined plate transparent glass is rotated about the optical axis 104 between the laser beam source 102 and the collimator lens 103 to correct the astigmatic difference of a focused beam. As described above, the optical part 101, e.g., an inclined plate glass 113, for correcting an astigmatic difference is incorporated in a cylindrical portion 112, and, as indicated by a portion surrounded by a broken line in FIG. 11, the cylindrical portion 112 is incorporated in the cylindrical portion 105 in which the laser beam source 102 and collimator lens 103 constituting a laser pen are integrated with each other. The circular window portion 107 is formed in the cylindrical portion 105, and an eccentric pin 108 is inserted in the window portion 107 to rotate/adjust the astigmatic difference correcting optical part 101, e.g., the inclined plate glass 113. A groove 109 in which the eccentric pin 108 is to be fitted is formed in the cylindrical portion 112 of the optical part 101 for correcting an astigmatic difference, and the astigmatic difference correcting cylindrical portion 112 is rotated about the optical axis 104 with rotation of the eccentric pin 108. Rotational driving of the eccentric pin 108 is performed through a rotational driving actuator 111 on the basis of the difference between the levels of an RF signal and a tracking error signal (to be described later).

Returning to FIG. 11, the optical path changing unit 120 comprises a compound prism 121. The compound prism 121 comprises first and second beam splitters 122 and 123 arranged in the longitudinal direction of the compound prism 121, and a 45° mirror portion 124 arranged at one end of the compound prism 121. In order to cause the compound prism 121 to change the elliptic shape of a collimated beam emerging from the collimator lens 103 into an almost circular shape, a beam shaping optical portion (not shown) is arranged in the optical path direction changing unit 120. The 45° mirror portion 124 is arranged to cause the collimated beam to be incident on and emerge from the optical disk 150. In addition, the beam splitters 122 and 123 change the direction of an optical path to detect a servo error signal and an RF signal.

Referring to FIG. 11 again, the spectral unit 130 comprises a dichroic mirror 131, a laser beam source 133, and an objective lens actuator 135. The laser beam source 133 comprises a hologram element 132. The objective lens actuator 135 comprises an objective lens 134. The dichroic mirror 131 is arranged in the propagation direction of the collimated beam raised by the 45° mirror portion 124. The dichroic mirror 131 causes a 680-nm beam to straightly propagate. The dichroic mirror 131 is optically designed such that when a beam from the laser beam source 133 having a wavelength of 780 nm is incident on the dichroic mirror 131 from the direction perpendicular to the optical path of the beam having a wavelength of 680 nm, the direction of the optical path of the beam is changed by 90°. The 780-nm beam reaches the objective lens actuator 135, and is focused on the disk 150. The direction of the beam reflected by the disk 150 is changed by 90° by the dichroic mirror 131. A focusing error is detected independently of a beam from the 680-nm optical head, and the above objective lens actuator 135 performs a focusing servo operation. More specifically, the optical head is controlled by the objective lens actuator 135 such that the relative, mechanical interval between the optical disk 150 and the optical head changed by the outer shape and rotation of the optical disk 150 is always kept constant.

In the example shown in FIG. 11, the hologram optical element 132 is incorporated in the 780-nm laser beam source 133. The laser beam source 133 detects a focusing error signal when the beam reflected by the disk returns to the laser beam source portion. A focusing error detection means is constituted by the dichroic mirror 131, the hologram optical element 132, and the laser beam source 133.

In addition, a 680-nm collimated beam 125 emitted from the optical head is also focused on the optical disk 150, and the reflected beam reversely propagates on the optical path of the incident beam and is incident on the compound prism 121 to reach the beam splitter 123 for detecting the RF signal and the beam splitter 122 for detecting the tracking error signal.

FIG. 13 shows the spectral characteristics of the dichroic mirror 131 shown in FIG. 11. As shown in FIGS. 11 to 13, the 680-nm laser beam source 102 and the 780-nm laser beam source 133 for independently performing the focusing servo operation for the objective lens 134 are implemented in the optical head. The laser beam source 102 is designed to have a thin-film structure in consideration of transmission characteristics, and the laser beam source 133 is designed to have a thin-film structure in consideration of reflection characteristics. The transmittance of a beam having a wavelength=680 nm (arrow) is 95%, and the transmittance of a beam having a wavelength=780 nm (arrow) is 5%. A reflectance is obtained by subtracting the reflectance (%) from 100%. In this manner, the independence of each optical system can be assured at a spectral ratio=19 (26 dB). Note that the dichroic mirror whose spectral characteristics are shown in FIG. 13 is designed such that the incident angle of a beam incident on a mirror plane is set to be 45°. However, when the incident angle is reduced to 40° and 30°, the dichroic mirror can be designed to decrease leakage beams in transmission and reflection.

Figure 14:
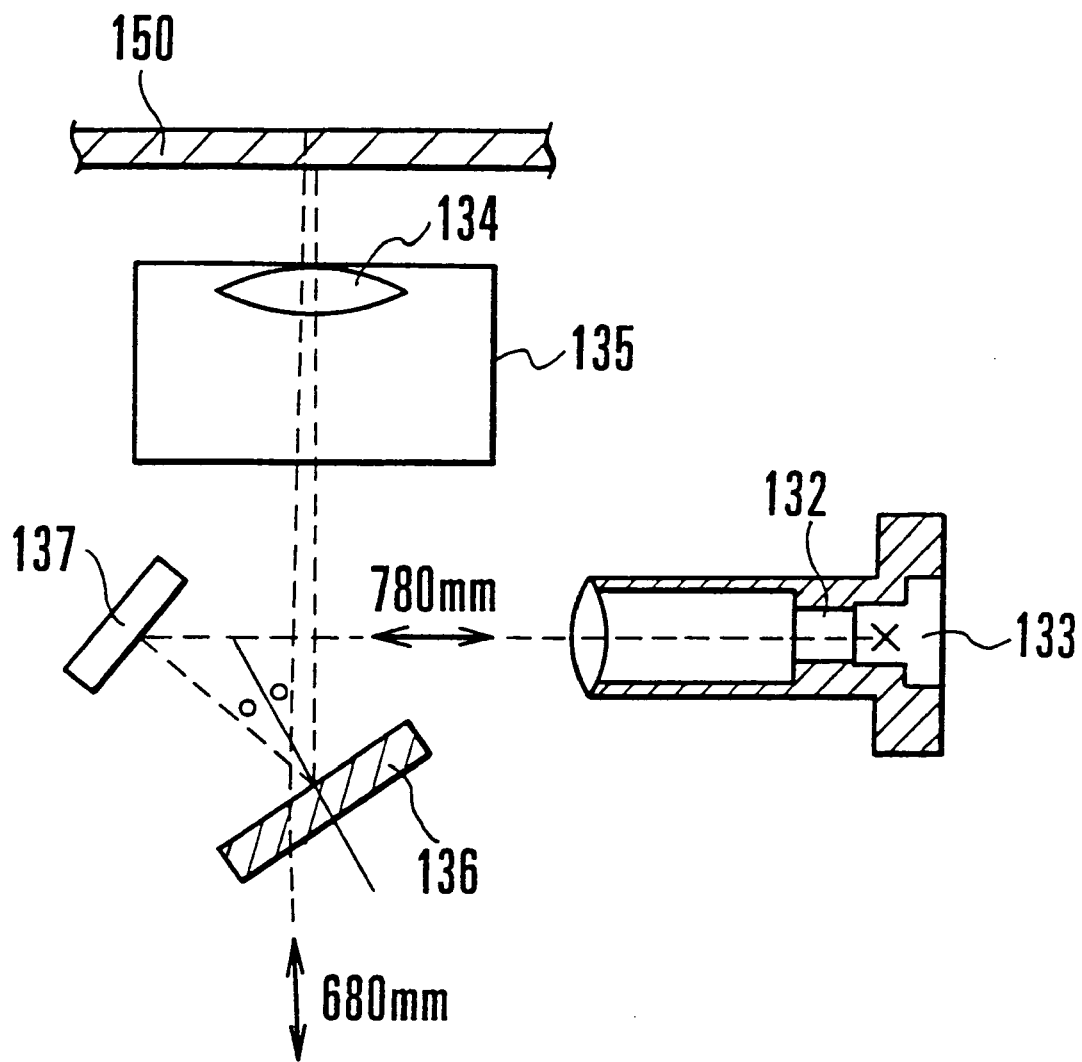
FIG. 14 is a view showing another example of the dichroic mirror shown in FIG. 11.
Figure 15:
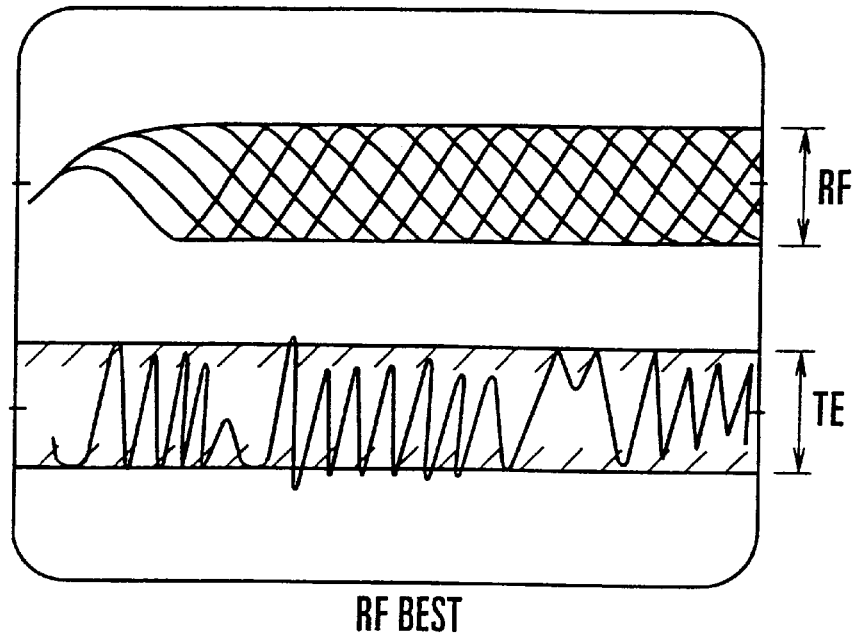
FIG. 15 is a graph showing a conventional RF signal which is not subjected to astigmatic difference correction.
Figure 16:
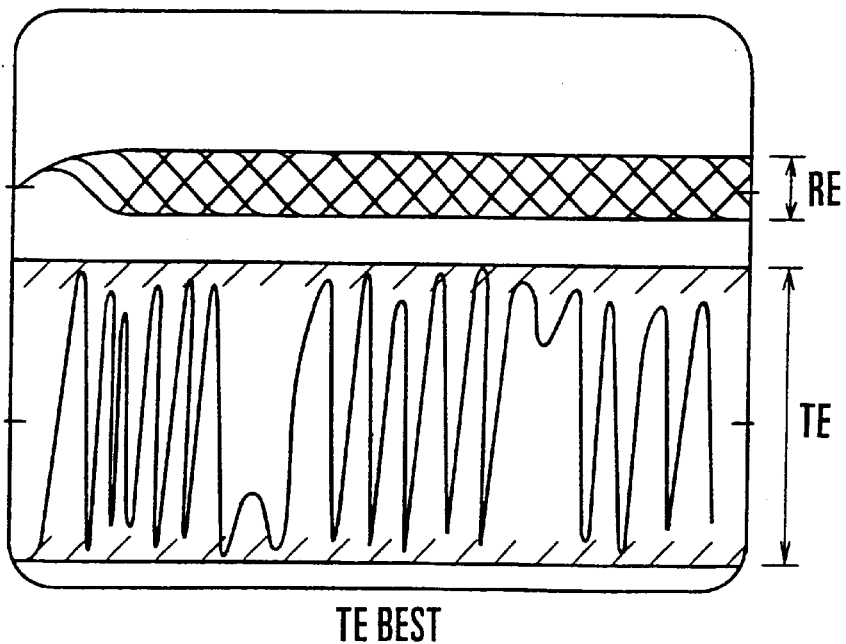
FIG. 16 is a graph showing a conventional tracking error signal which is not subjected to astigmatic difference correction.

FIG. 14 shows the optical arrangement of another spectral portion obtained such that the spectral characteristics of the dichroic mirror 131 are improved. As shown in FIG. 14, a beam from the 780-nm laser beam source 133 is temporarily incident on a dichroic mirror 136 having an incident angle=30° through a reflecting mirror 137. A beam reflected by the dichroic mirror 136 is incident on the objective lens 134. With this arrangement, the phase difference between P- and S-polarized components can be suppressed to be small, and this head can be satisfactorily used as not only an optical head for recording/reproducing data on/from a phase-change medium but also a magneto-optical head.

Returning to FIG. 11 again, the error detector 140 comprises a λ/2 plate 141 and a direction changing beam splitter 142 which are arranged on an optical path of a beam whose direction is changed by the beam splitter 123. In addition, a first error detection means is constituted by a pair of P- and S-polarizing photosensors 143 and 144 for detecting two types of beams from the direction changing beam splitter 142 and a first differential amplifier 145 electrically connected to the photosensors 143 and 144. In addition, a first detection circuit 146 is electrically connected to the first differential amplifier 145.

The error detector 140 includes a second error detection means constituted by a two-division photosensor 147 arranged on the optical path of a beam whose direction is changed by the beam splitter 122, and a second differential amplifier 148 connected to the output terminals of the two-division photosensor 147. The error detector 140 includes a second detection circuit 149 connected to the second error detection means. A third differential amplifier 151 is connected to the output terminals of the first detection circuit 146 and the second detection circuit 149, and the third differential amplifier 151 is connected to a control device 160 to output an output from the third differential amplifier 151 to the control device 160. The first detection circuit 146, the second detection circuit 149, and the third differential amplifier 151 constitute a level determination means.

An operation of the error detector 140 will be described below.

In the first error detection means, a beam whose direction is changed by 90° by the beam splitter 123 is transmitted through the λ/2 plate 141 to change the polarized direction of the beam, and the direction changing beam splitter 142 splits the beam into two types of light waves, i.e., P- and S-polarized beams. These beams are received by the P- and S-polarizing photosensors 143 and 144, respectively, and outputs from the P- and S-polarizing photosensors 143 and 144 are supplied to the first differential amplifier 145, thereby obtaining a magneto-optical RF signal from the first differential amplifier 145.

In the second error detection means, a beam changed by 90° by the second beam splitter 122 is input to the two-division photosensor 147, and tracking error detection using a push-pull scheme is performed. A tracking error signal is obtained by inputting two outputs from the two-division photosensor 147 to the second differential amplifier 148. In this case, when a focusing offset is changed, both the signals must be changed in the same manner.

For this reason, in the level determination means, in order to detect the levels of the RF signal and the tracking error signal, the RF signal and the tracking error signals are supplied to the detection circuits 146 and 149 comprising diodes 146a and 149a. Outputs from the detection circuits 146 and 149 are subtracted from each other by the third differential amplifier 151 in an analog manner in FIG. 11. A result obtained from the differential amplifier 151 is input to the control device 160.

The control device 160 and the actuator 111 constitute a rotation/adjustment means. In the control device 160, a control signal corresponding to the subtraction result from the third differential amplifier 151, e.g., a signal for driving the actuator 111 in a direction to minimize the value of the subtraction result, is output to the actuator 111. The actuator 111 is an electromechanical transducer, and rotates and adjusts the astigmatic difference correcting optical part 101 about an optical axis in accordance with the control signal to correct the astigmatic difference.

In this embodiment, adjustment of the optical part for correcting an astigmatic difference is performed through an electromechanical transducer having a control system and an actuator connected to the control system. In this manner, in adjustment of a focusing offset for high-density recording, a best signal reproduction state can be obtained under optimal servo conditions. For this reason, a best carrier/noise ratio (CNR) can be obtained while stable servo characteristics are kept.

As has been described above, according to the present invention, a focusing offset for the best RF signal coincides with a focusing offset for the best tracking error signal. As a result, satisfactory servo characteristics can be extracted, and preferable recording/reproducing characteristics can be obtained.

What is claimed is:

1. An astigmatic difference correcting apparatus for an optical head, comprising:

a first laser beam source, having an astigmatic difference, for emitting a recording/reproducing laser beam;

a collimator lens, having a cylindrical shape, for converting the laser beam from said laser beam source into a parallel beam to output the parallel beam to an optical disk; and rotational optical means, arranged between said laser beam source and said collimator lens to be rotatable around an optical path of the laser beam, for causing rotation and adjustment to set a minimum difference between focal positions in an X-axis direction and in a Y-axis direction which are perpendicular to the optical axis of the laser beam, further comprising a thin-walled cylindrical holder member which holds said collimator lens in one opening end of said cylindrical holder member to be movable in a direction of the optical path of the laser beam, has said laser beam source arranged in the other opening end, and rotatably holds said rotational optical means having a cylindrical shape between said collimator lens and said laser beam source.

2. An apparatus according to claim 1, further comprising an engaging portion formed in said rotational optical means, a hole portion formed in said holder member in correspondence with said rotational optical means, and a lever member engaged with said engaging portion through said hole portion to rotate and adjust said rotational optical means.

3. An apparatus according to claim 2, further comprising a pair of slits, formed at opposing positions of said holder member, for making said collimator lens movable while said collimator lens is fitted in one end of said holder member, and wherein said hole portion is formed in a bottom portion of one of said pair of slits.

* * * * *